US012710569B2

(12) United States Patent
Laning et al.

(10) Patent No.: US 12,710,569 B2
(45) Date of Patent: Aug. 18, 2026

(54) OPTICAL DEVICE COMPRISING A MOTOR AND A CAM FOR ADJUSTING THE OPTICAL DEVICE

(71) Applicant: OPTOTUNE AG, Dietikon (CH)

(72) Inventors: Christopher Laning, Windisch (CH); Roman Patscheider, Winterthur (CH); Markus Geissner, Bergdietikon (CH)

( * ) Notice: Subject to any disclaimer, the term of this patent is extended or adjusted under 35 U.S.C. 154(b) by 748 days.

(21) Appl. No.: 17/261,016

(22) PCT Filed: Jul. 18, 2019

(86) PCT No.: PCT/EP2019/069416

§ 371 (c)(1),
(2) Date: Jan. 17, 2021

(87) PCT Pub. No.: WO2020/016376

PCT Pub. Date: Jan. 23, 2020

(65) Prior Publication Data

US 2021/0263199 A1 Aug. 26, 2021

(30) Foreign Application Priority Data

Jul. 18, 2018 (EP) .................................... 18184322

(51) Int. Cl.

*G02B 3/14* (2006.01)
*G02B 7/02* (2021.01)
*G02B 7/04* (2021.01)

(52) U.S. Cl.

CPC ............... *G02B 3/14* (2013.01); *G02B 7/023* (2013.01); *G02B 7/04* (2013.01)

(58) Field of Classification Search

CPC ............. G02B 3/14; G02B 7/023; G02B 7/04
See application file for complete search history.

(56) References Cited

U.S. PATENT DOCUMENTS 4,732,458 A 3/1988 Zambelli
5,440,357 A * 8/1995 Quaglia .................. G02C 7/08 351/227
5,526,067 A 6/1996 Cronin
5,999,328 A 12/1999 Kurtin
9,980,639 B2 5/2018 Nauche
2010/0142059 A1 6/2010 Chou
2010/0208357 A1* 8/2010 Batchko .................. G02B 5/20 359/666

(Continued)

FOREIGN PATENT DOCUMENTS

CN 1882856 12/2006
CN 102422185 4/2012

(Continued)

OTHER PUBLICATIONS

Son et al.: "Tunable-focus liquid lens system controlled by antagonistic winding-type SMA actuator", Opt Express, Aug. 3, 2009;17(16):14339-50. doi: 10.1364/oe.17.014339.

*Primary Examiner* — Thomas K Pham
*Assistant Examiner* — Justin W. Hustoft
(74) *Attorney, Agent, or Firm* — JMB Davis Ben-David

(57) ABSTRACT

The invention relates to an optical device comprising an optical element (10), a motor (5), and a cam (4), wherein the motor (5) is configured to rotate the cam (4) so that the cam (4) interacts with the optical element (10) to adjust a parameter of the optical element (10).

19 Claims, 10 Drawing Sheets

(56) References Cited

U.S. PATENT DOCUMENTS

| | | | | |
|---|---|---|---|---|
| 2013/0308211 | A1* | 11/2013 | Okada | G03B 3/10 359/819 |
| 2016/0259094 | A1* | 9/2016 | Aschwanden | G02B 27/095 |
| 2020/0341172 | A1 | 10/2020 | Stevens | |

FOREIGN PATENT DOCUMENTS

| | | | |
|---|---|---|---|
| CN | 106413523 | 2/2017 | |
| CN | 107920732 | 4/2018 | |
| EP | 2034338 | 3/2009 | |
| EP | 2860555 | 4/2015 | |
| FR | 2615000 | 11/1988 | |
| JP | 2006276200 | 10/2006 | |
| WO | 2010002784 | 1/2010 | |
| WO | WO-2016202392 A1 * | 12/2016 | G02B 26/004 |
| WO | 2018028847 | 2/2018 | |
| WO | 2019232282 | 12/2019 | |

* cited by examiner 1
70
2
33
31
31a
41
4
42
70a
203
200
203
200
321
21a
21
R
51
50,
50a
5
52
20
22
10
34
322
3
60
32
32a
30

1
10
2
3
4
5
20
21
21a
22
30
31
31a
32
32a
33
34
41
42
51
52
60
70
70a
200
200
203
203
321
322
R

C
R
4
42
41
41a
70a
70b
70

4
41a
70a
70b
70
41
42

4
42
41
41a
70b
70
70a

OPTICAL DEVICE COMPRISING A MOTOR AND A CAM FOR ADJUSTING THE OPTICAL DEVICE

CROSS-REFERENCE TO RELATED APPLICATIONS

This is the U.S. National Stage of International Patent Application No. PCT/EP2019/069416 filed on Jul. 18, 2019, which claims priority to European Patent Application No. 18184322.8 filed on Jul. 18, 2018.

SPECIFICATION

The present invention relates to optical devices.

Optical devices comprise, for example, an optical element having a tunable optical property, for example, a tunable focal length.

Particularly, it is an objective of the present invention to provide a mechanism for precise tuning of such an optical property of an optical device of the afore-mentioned kind.

An optical device is disclosed, comprising: an optical element, a motor, and a cam, wherein the motor is configured to rotate the cam so that the cam mechanically interacts with the optical element to adjust a parameter of the optical element.

Advantageously, using such a motor cam combination allows for high force efficacy with respect to the volume, mass and electrical power of the actuator system. Particularly, utilizing a bellows in certain embodiments also reduces the volume and mass of the optical device/lens according to the present invention. Particularly, the motor is a rotary motor.

According to an embodiment, the optical element is a lens, wherein the parameter is a focal length of the lens.

Further, in an alternative embodiment, the optical element can be a prism, wherein said parameter is a prism angle of the prism.

Furthermore, according to an embodiment, the optical element comprises a container, wherein the container comprises a first wall and an opposing second wall, wherein the first wall comprises a transparent portion, and wherein the second wall comprises a transparent portion.

Further, the container is filled with a transparent liquid arranged between the transparent portions of the walls.

Particularly, the motor is configured to rotate the cam about a rotation axis. Particularly, the rotation axis can extend orthogonal to the optical axis of the lens.

Further, according to an embodiment of the present invention, the first wall comprises a circumferential support frame and a rigid transparent cover element (e.g. cover glass) that is connected to the support frame of the first wall, wherein the cover element forms the transparent portion of the first wall. Furthermore, particularly, the second wall comprises a circumferential support frame and an elastically deformable membrane that is connected to the support frame of the second wall, wherein the membrane forms the transparent portion of the second wall.

Particularly, in the above embodiment, the support frame of the second wall forms a lens shaper that defines an area of the membrane that comprises a curvature that is adjustable to adjust the focal length of the lens. Particularly, this area is an area of the membrane that covers a through-opening of the support frame of the second wall, wherein this through-opening is delimited by a circular inner edge of the support frame of the second wall. The area of the membrane thus closes or covers the through-opening and extends up to this circular inner edge. Particularly, the area of the membrane forms or comprises the transparent portion of the membrane.

According to an alternative embodiment, the cover element and the membrane can also be interchanged. Here, the first wall comprises a circumferential support frame and an elastically deformable membrane that is connected to the support frame of the first wall, wherein the membrane forms the transparent portion of the first wall. Furthermore, particularly, the second wall comprises a circumferential support frame and a rigid transparent cover element (e.g. cover glass) that is connected to the support frame of the second wall, wherein the cover element forms the transparent portion of the second wall. Particularly, in this embodiment, the support frame of the first wall can form a lens shaper that defines an area of the membrane that comprises an adjustable curvature. Particularly, this area can be an area of the membrane that covers a through-opening of the support frame of the first wall, wherein this through-opening is delimited by a circular inner edge of the support frame of the first wall. The area of the membrane thus closes or covers this through-opening of the support frame of the first wall and extends up to this circular inner edge. Particularly, as before, the area of the membrane can form or comprise the transparent portion of the membrane.

Particularly, when the lens shaper of the lens is fixed and the motor and cam act on the wall comprising the cover element stiffness is advantageously added to the system.

Further, according to an embodiment of the present invention, the cam is configured to interact with the container to adjust a curvature of the membrane (particularly a curvature of said area of the membrane) and thereby the parameter (e.g. focal length) of the optical element (e.g. lens).

Furthermore, according to an embodiment of the present invention, the motor is mounted to the first wall.

Further, according to an embodiment of the present invention, the motor is mounted to the support frame of the first wall via at least one motor mount connected to the support frame of the first wall.

Further, according to an embodiment of the present invention, the at least one motor mount encompasses a housing of the motor along a periphery of the housing.

Particularly, in an embodiment, the motor mount is configured to clamp the housing of the motor between a first and a second arm of the at least one motor mount. Particularly, the at least one motor mount comprises a screw configured to be tightened to press the two arms of the at least one motor mount together to clamp the housing of the motor. Particularly, the housing comprises a cylindrical portion that is clamped by the at least one motor mount.

Further, according to an embodiment of the present invention, the second wall is pivotably mounted to the first wall, particularly such that the second wall can be pivoted towards and away from the first wall.

Further, according to an embodiment of the present invention, the support frame of the second wall is pivotably mounted to the support frame of the first wall.

Further, according to an embodiment of the present invention, the second wall is pivotably mounted to support frame of the first wall via two bearings.

Further, according to an embodiment of the present invention, the first and the second wall are connected to one another by a flexible lateral wall of the container. Particularly, in an embodiment, the lateral wall is connected to the support frame of the first wall and to the support frame of the second wall.

Further, according to an embodiment of the present invention, the lateral wall forms a bellows.

Further, according to an embodiment of the present invention, the cam is configured to press against a contact surface connected to the second wall so that when the cam is rotated by the motor the second wall is pivoted away or towards the first wall to adjust the curvature of the membrane and therewith the parameter (e.g. focal length) of the optical element (e.g. lens).

Particularly, the curvature is adjusted by pivoting the second wall due to the fact the liquid filling the container is essentially incompressible. Thus, when the second wall is pivoted towards the first wall, the membrane may develop a more pronounced bulge due to the constant volume of the liquid. Further, in case the second wall is pivoted away from the first wall, the membrane may develop a less pronounced bulge. Particularly, the optical device can comprise a means (e.g. a spring) for providing a restoring force on the second wall.

Particularly, when the initial curvature of the membrane is flat, the membrane develops a convex curvature when the second wall is pivoted towards the first wall, while it develops a concave curvature when the second wall is pivoted away from the first wall.

Furthermore, in case the initial curvature of the membrane is concave, the membrane develops a less concave or even a flat or convex curvature when the second wall is pivoted towards the first wall, while it develops a more pronounced concave curvature when the second wall is pivoted away from the first wall.

Furthermore, in case the initial curvature of the membrane is convex, the membrane develops a more convex curvature when the second wall is pivoted towards the first wall, while it develops a less convex or even a flat or concave curvature when the second wall is pivoted away from the first wall.

Particularly, the fluidic pressure of the liquid in the container that acts on the membrane can be used to provide a restoring force.

According to an embodiment in which the focal power of the lens is tuned to a negative focal power, the cam acts to push the second wall away from the first wall, but a complementary embodiment (lens tuning to positive focal power) has the cam pivoting the second wall towards the first wall and the fluidic pressure/membrane providing the restoring force.

Further, according to an embodiment of the present invention, the contact surface is formed by the support frame of the second wall or by an arm connected to the support frame of the second wall. The contact surface (cam follower) may also be formed by some other element connected to the support frame of the second wall.

Further, according to an embodiment of the present invention, the arm (or the contact surface) is configured such that the membrane is flat or concave or convex under a load exerted by the cam on the arm. Particularly, the lens can be configured to be tuned regarding its focal power in the range from −0.5 dpt to −3 dpt.

Further, according to an embodiment of the present invention, the arm protrudes from a first section of the support frame of the second wall, which first section opposes a second section of the support frame of the second wall along a direction running perpendicular to an optical axis of the lens (and particularly to the rotation axis of the motor), via which second section of the support frame of the second wall the second wall is pivotably mounted to the support frame of the first wall.

Further, according to an embodiment of the present invention, the optical device comprises a pump reservoir, wherein the cam is configured to actuate the pump reservoir to pass liquid from the pump reservoir into the container so as to adjust the parameter (e.g. focal length) of the optical element (e.g. lens).

Further, according to an embodiment of the present invention, the parameter (e.g. focal length) of the optical element (e.g. lens) is adjustable within a tuning range of the parameter, wherein the cam is configured such that when the cam is rotated by the motor a torque acting on the cam is constant within the tuning range.

Further, according to an embodiment of the present invention, the motor comprises an encoder configured to provide an output signal indicative of a position of the cam, wherein particularly the optical device is configured to use the output signal to control the motor so that an actual value of the parameter (e.g. an actual focal length) of the optical element (e.g. lens) approaches a desired reference value of the parameter (e.g. a reference focal length).

Further, according to an embodiment of the present invention, the optical device comprises a sensor arranged on the arm to measure a position of the second wall, wherein particularly the sensor is configured to provide an output signal indicative of the position, wherein particularly the optical device is configured to use the output signal to control the motor so that an actual value of the parameter (e.g. an actual focal length) of the optical element (e.g. lens) approaches a desired reference value of the parameter (e.g. a reference focal length). Here, the feedback mechanism is incorporated on the arm to reduce a tolerance chain on the feedback mechanism.

Further, according to an embodiment of the present invention, the cam is optimized for linear response or non-linear response by a corresponding shape of the cam. Particularly, the cam shape depends on the force vs. position curve of the cam follower.

Further, according to an embodiment of the present invention, the motor comprises a drive shaft that is rotatable by the motor about the rotation axis, wherein the cam comprises an excentric member arranged on the drive shaft of the motor so that a center of the excentric member is spaced apart from the rotation axis or from a center of the drive shaft, and wherein the cam further comprises a bearing arranged on the excentric member, which bearing is configured to contact the contact surface.

Further, according to an embodiment of the present invention, the optical device is configured to adjust the parameter (e.g. focal length) of the optical element (e.g. lens) to assume one of a plurality of discrete parameter values (e.g. discrete focal lengths), wherein the cam comprises for each of the discrete parameter values a region, wherein the respective region of the cam is configured to contact the contact surface so that the associated discrete parameter value is assumed by the optical element (e.g. lens), wherein the respective region is adapted such that a torque acting on the cam when the respective region contacts the contact surface vanishes or corresponds to a local minimum of the torque. In other words, the cam is designed such that it includes low or no torque regions to reduce electrical load for the discrete parameter values/focal lengths.

Further, according to an embodiment of the present invention, the optical device comprises a clutch configured to decouple the cam from the motor (and particularly also to couple the cam to the motor). Such a clutch may be incorporated into the design to reduce load at defined operation points.

Further, according to an embodiment of the present invention, the optical device comprises a brake configured to act on the rotation axis/drive shaft of the motor (e.g. to reduce load at defined operation points).

Further, according to an embodiment of the present invention, the optical device comprises a further optical element and a further cam, wherein the motor is configured to rotate the further cam so that the further cam mechanically interacts with the further optical element to adjust a parameter of the further optical element.

In an embodiment, the further optical element is a further lens, wherein the parameter of the further optical element is a focal length of the further lens.

Furthermore, according to an embodiment, the cam and the further cam are configured such that the parameters of the lens and of the further lens are one of: individually adjusted, adjusted such that they are identical to one another, adjusted such that they are reciprocal to one another.

Furthermore, according to an embodiment, the optical device comprises multiple lenses or optical elements with different shaped or oriented cams to control all lenses or optical elements in an individual manner.

Further, according to an embodiment of the present invention, the arm or a portion of the optical device, particularly a portion connected to the arm, comprises a material having a thermal expansion characteristic that compensates a thermal expansion of the liquid in the container to reduce a drift of the focal length of the lens (e.g. for a given position of the cam).

Further, according to an embodiment, the cam, particularly the bearing of the cam, and the contact surface each comprise a material, wherein the two materials contact one another, so that a defined friction is generated between the material to reduce power consumption in holding positions (e.g. when the cam is at rest and the lens comprises a constant focal power).

Further, according to an embodiment of the present invention, the optical device comprises a worm drive which couples the motor to the cam motor.

Particularly, such a worm drive can be used to reduce power consumption in a holding position (e.g. of the second wall) such that the focal length is fixed.

Furthermore, according to an embodiment, the optical device comprises a (e.g. sealed) casing (forming e.g. an outermost visible surface of the optical device), wherein particularly the casing is configured to enclose the cam and the motor, wherein at least one of: a non-actuated optical element of the optical device, the cover element, the support frame of the first wall, the support frame of the second wall, forms a portion of the casing, particularly an integral portion of the casing (e.g. by way of injection molding).

Further, according to an embodiment, the optical device forms an eyewear, wherein the lens is configured to be arranged in front of an eye of a person. Particularly, the eyewear can comprise one or several adjustable lenses according to the present invention for each eye of the person.

Further, according to an embodiment, the non-actuated optical element or the cover element forms an outermost optical element of the optical device.

Furthermore, according to an embodiment, the casing forms a bezel configured to hide a glue joint between the non-actuated optical element and the casing or between the cover element and the casing.

In the following, further advantages, features as well as embodiments of the present invention are described with reference to the Figures, wherein.

Figures 1, 2:
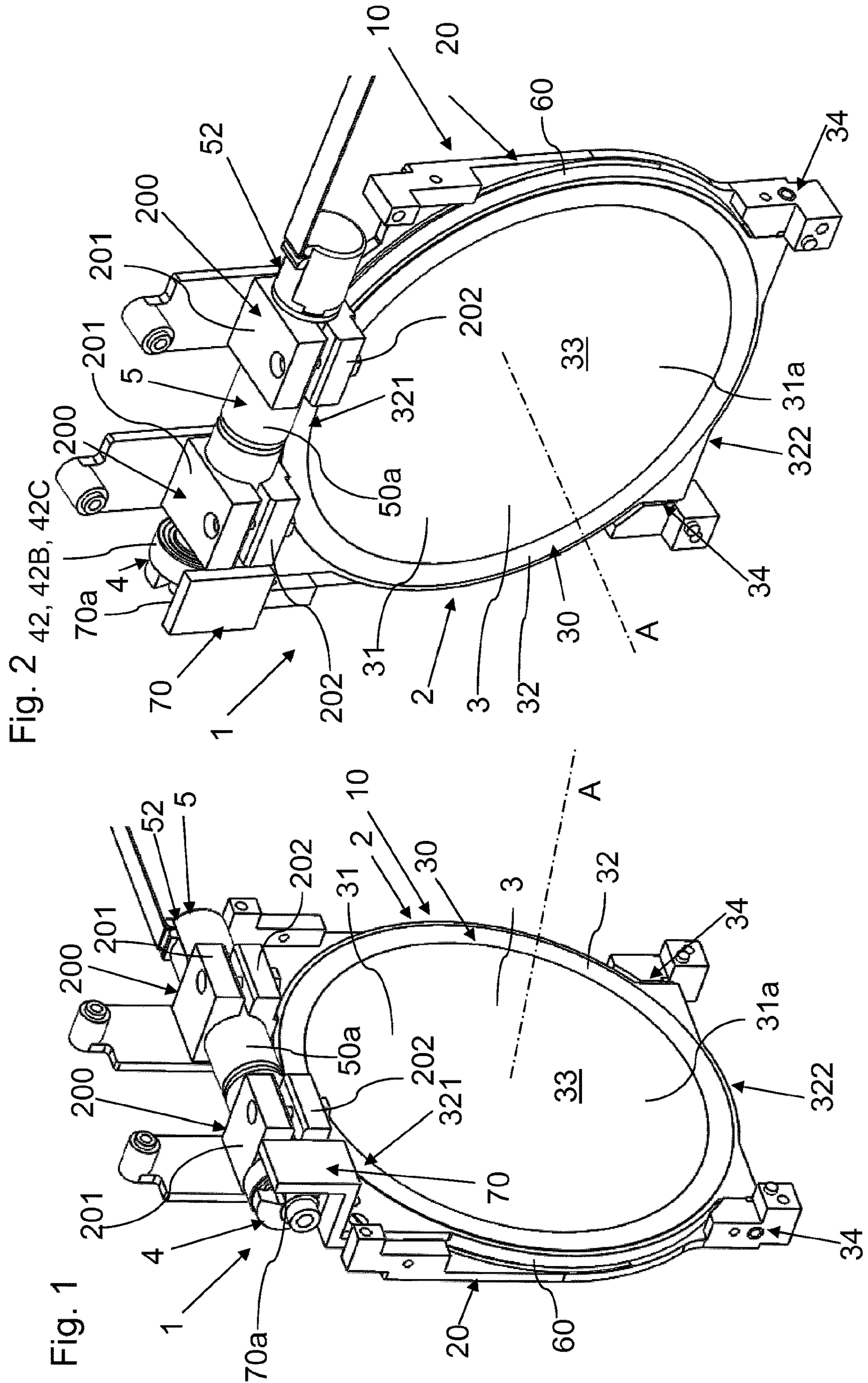
FIG. 1 shows a perspective view of an embodiment of an optical device according to the present invention.
FIG. 2 shows a further perspective view of the optical device shown in FIG. 1.

FIG. 1 shows in conjunction with FIGS. 2 to 5 an embodiment of an optical device 1 according to the present invention, wherein the optical device 1 comprises an optical element 10, a motor 5, and a cam 4, wherein the motor 5 is configured to rotate the cam 4 (e.g. about a rotation axis R) so that the cam 5 interacts with the optical element 10 to adjust a parameter of the optical element 10.

According to FIG. 1 the optical element 10 can be a tuneable liquid lens 10, wherein said parameter is a focal length of the lens 10.

Further, as shown in FIGS. 1 to 5, the lens 10 comprises a container 2 having a first wall 20 and an opposing second wall 30, wherein the first and the second wall 20, 30 each comprise a transparent portion 21*a*, 31*a*. Furthermore, the container 2 is filled with a transparent liquid 3 that is arranged between the transparent portions 21*a*, 31*a* of the walls 20, 30. Thus, light can pass the container 2 via the transparent portions 21*a*, 31*a*, and the transparent liquid 3 therebetween.

Particularly, the first wall 20 comprises a circumferential support frame 22 and a rigid transparent cover element 21 (e.g. a flat circular cover glass) that is connected to the support frame 22 of the first wall 20, wherein the cover element 21 forms the transparent portion 21*a* of the first wall 20. Further, particularly, the second wall 30 comprises a circumferential support frame 32 and an elastically deformable membrane 31 that is connected to the support frame 32 of the second wall 20, wherein the membrane 31 forms the transparent portion 31*a* of the second wall (30).

Figures 3, 3A, 3B:
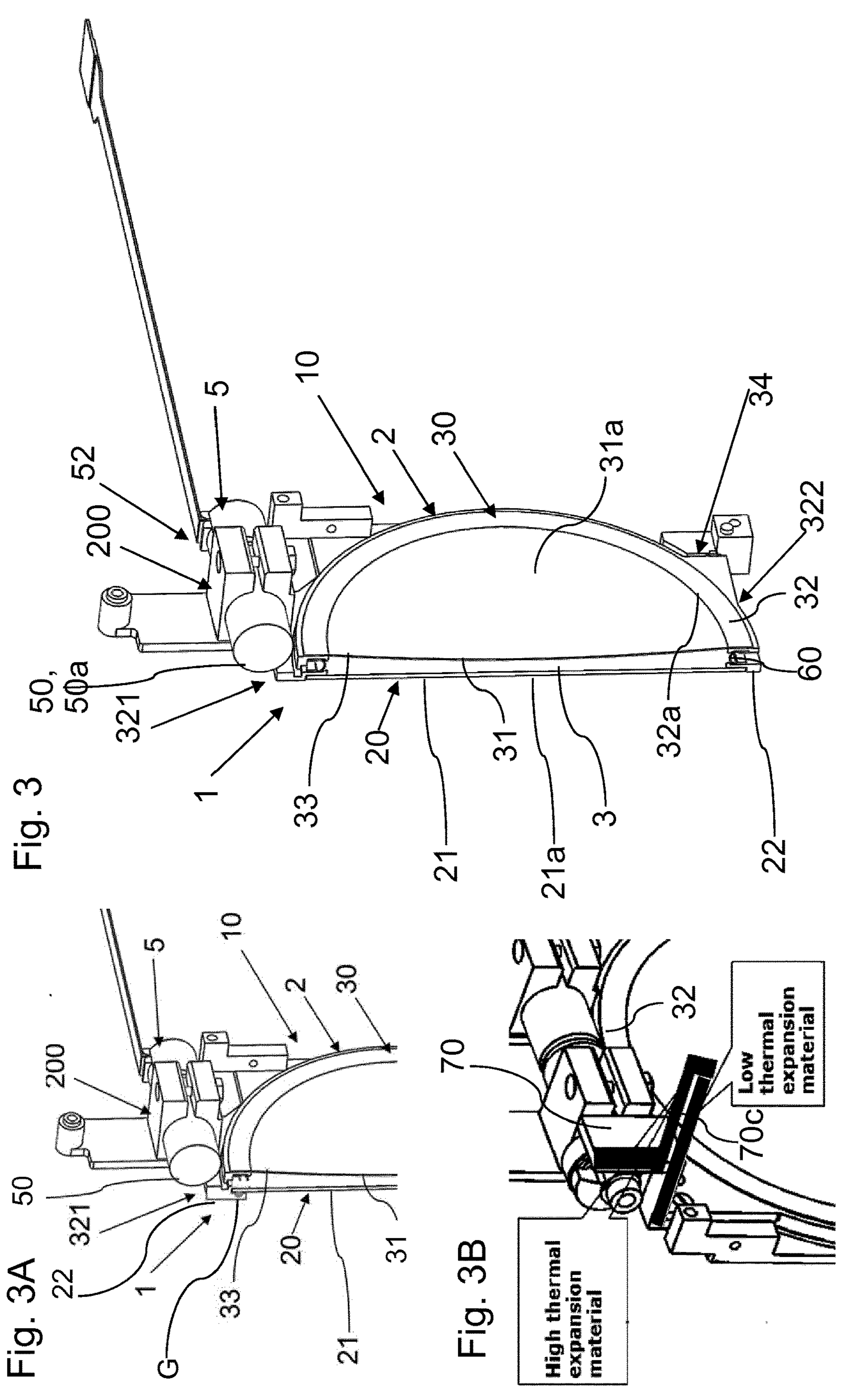
FIG. 3 shows a cross-sectional view of the optical device shown in FIGS. 1 and 2.
FIG. 3A shows a modification of the support frame of the optical device shown in FIG. 3.
FIG. 3B shows a modification of the arm shown in FIG. 3 to reduce temperature drift of the focal length upon operation of the optical device.

Particularly, according to an embodiment of the present invention, as shown in the detail FIG. 3A, the support frame 22 of the first wall 20 can form a bezel that is configured to cover a glue joint G between the cover element 21 and the support frame 22.

For accurately defining the shape of the lens 10, the support frame 32 of the second wall 30 functions as a lens shaper and comprises an inner edge 32*a* that delimits a through-opening 33 of the support frame 32 of the second wall 30, wherein the inner edge 32*a* defines an (e.g. circular) area 31*a* of the membrane 31 that comprises a curvature that can be adjusted by acting on the container 2 in order to adjust the focal length (parameter) of the lens 10. Particularly, this area 31*a* is (or comprises) the transparent portion 31*a* of the second wall 30 and closes (or covers) the through-opening 33 of the support frame 32 of the second wall 30. Thus, particularly, the area 31*a* of the membrane 31 extends up to this circular inner edge 32*a*.

The cam 4 is configured to interact with the container 2 to adjust the curvature of said area 31*a* of the membrane 31 and thereby said parameter, i.e., the focal length of the lens 10.

The motor 5 for driving the cam 4 is preferably mounted to the first wall 20, particularly to the support frame 22 of the first wall 20. This is e.g. achieved by two motor mounts 200 that are connected to the support frame 22 of the first wall 20, wherein the respective motor mount 200 encompasses a housing 50 of the motor 5 along a periphery of the housing 50. Particularly, the respective motor mount 200 is configured to clamp the housing 50 of the motor 5 between a first and a second arm 201, 202 of the respective motor mount 200. For this, the motor mounts 200 can each comprise a screw 203, wherein the respective screw 203 is configured to be tightened to press the two arms 201, 202 of the respective motor mount 200 together to clamp the housing 50 of the motor 5. Particularly, the housing 50 comprises cylindrical portions 50*a* that are clamped by the motor mounts 200.

In order to allow the cam 4 to interact with the container 2 of the lens 10, the second wall 30 can be pivotably mounted to the first wall 20 such that the second wall 30 can be pivoted towards and away from the first wall 20. For this, the support frame 32 of the second wall 30 can be pivotably mounted to the support frame 22 of the first wall 20, e.g. via two bearings 34.

Furthermore, for allowing the second wall 30 to be pivotable with respect to the first wall, the first and the second wall 20, 30 are preferably connected to one another by a flexible lateral wall 60 so that the container 2 can enclose the liquid 3 in a sealed fashion. Particularly, the lateral wall 60, which can be a bellows, is connected to the annular support frame 22 of the first wall 20 and to the annular support frame 32 (lens shaper) of the second wall 30.

A mechanical coupling between the cam 4 and the support frame 32 of the second wall 30 can be established by means of a contact surface 70*a* provided on an arm 70 that protrudes from the support frame 32 of the second wall 30. Particularly, the cam is configured to contact the contact surface 70*a* so that when the cam 4 is rotated by the motor 5 it can move the arm 70 and therewith pivot the second wall 30 due to the excentric shape of the cam 4.

This allows to adjust the curvature of said area 31*a* of the membrane 31 and therewith the focal length of the lens 10. A restoring force provided by the membrane 31 allows to pivot the second wall 30 towards the first wall 20 provided that the cam 4 contacting the contact surface 70*a* allows this movement due to its shape.

The curvature of said area 31*a* of the membrane 31 can be adjusted in principle by pivoting the second wall 30 due to the fact the liquid 3 filling the container 2 is essentially incompressible. Thus, when the second wall 30 is pivoted with respect to the first wall 20, said area 31*a* of the membrane 31 changes its curvature which means that the focal length of the lens 10 changes. In FIG. 3, the area 31*a* of the membrane 31 comprises a concave curvature. Pivoting the second wall 30 away from the first wall by corresponding rotation of the cam 4 about the rotation axis R using the motor 5 will thus form a more pronounced concave curvature. Pivoting the second wall 30 towards the first wall 20 will generate a less pronounced concave curvature or even a flat or convex area 31*a* of the first membrane 31. Since the light passes the area 31*a* of the membrane 31 when traveling through the container 2/lens 10, the curvature of this area 31*a* of the membrane 31 determines the focal length of the lens 10.

Particularly, as can be seen e.g. from FIGS. 1 to 3, the arm 70 protrudes from a first (upper) section 321 of the support frame 32 of the second wall 30, which first section 321 opposes a second (lower) section 322 of the support frame 32 of the second wall 30 in a direction running perpendicular to an optical axis A of the lens, via which second section 322 of the support frame 32 of the second wall 30 the second wall 30 is pivotably mounted to the support frame 22 of the first wall 20 (via said bearings 34).

Furthermore, as shown in the detail FIG. 3B, in order to reduce a temperature induced drift of the focal length of the lens 10, the arm 70 of the optical device 1 can comprise a portion 70*c* formed out of a high thermal expansion material, which portion connects to a low thermal expansion material of the support frame 32. Thus, the portion 70*c* causes the second wall 30 to move relative to the first wall 20 for a given position of the cam 4 through an operation temperature of the optical device 1 that affects the portion 70*c* and causes it to expand. Particularly, the material of said portion 70*c* and its geometry are selected such that said temperature-induced movement of the second wall 30 due to said portion 70*c* compensates a thermal expansion of the liquid 3 in the container 2 so as to reduce the drift of the focal length of the lens 10.

Furthermore, for controlling the motor 5 and therewith adjustment of the focal length of the lens 10, the motor 5 can comprise an encoder 52 configured to provide an output signal indicative of a position of the cam 4 that is mounted on a drive shaft 51 of the motor 5 so that the drive shaft 51 is rotatable about said rotation axis R. Particularly, the optical device 1 is configured use the output signal to control the motor 5 so that an actual focal length of the lens 10 approaches a desired reference focal length.

Figure 4:
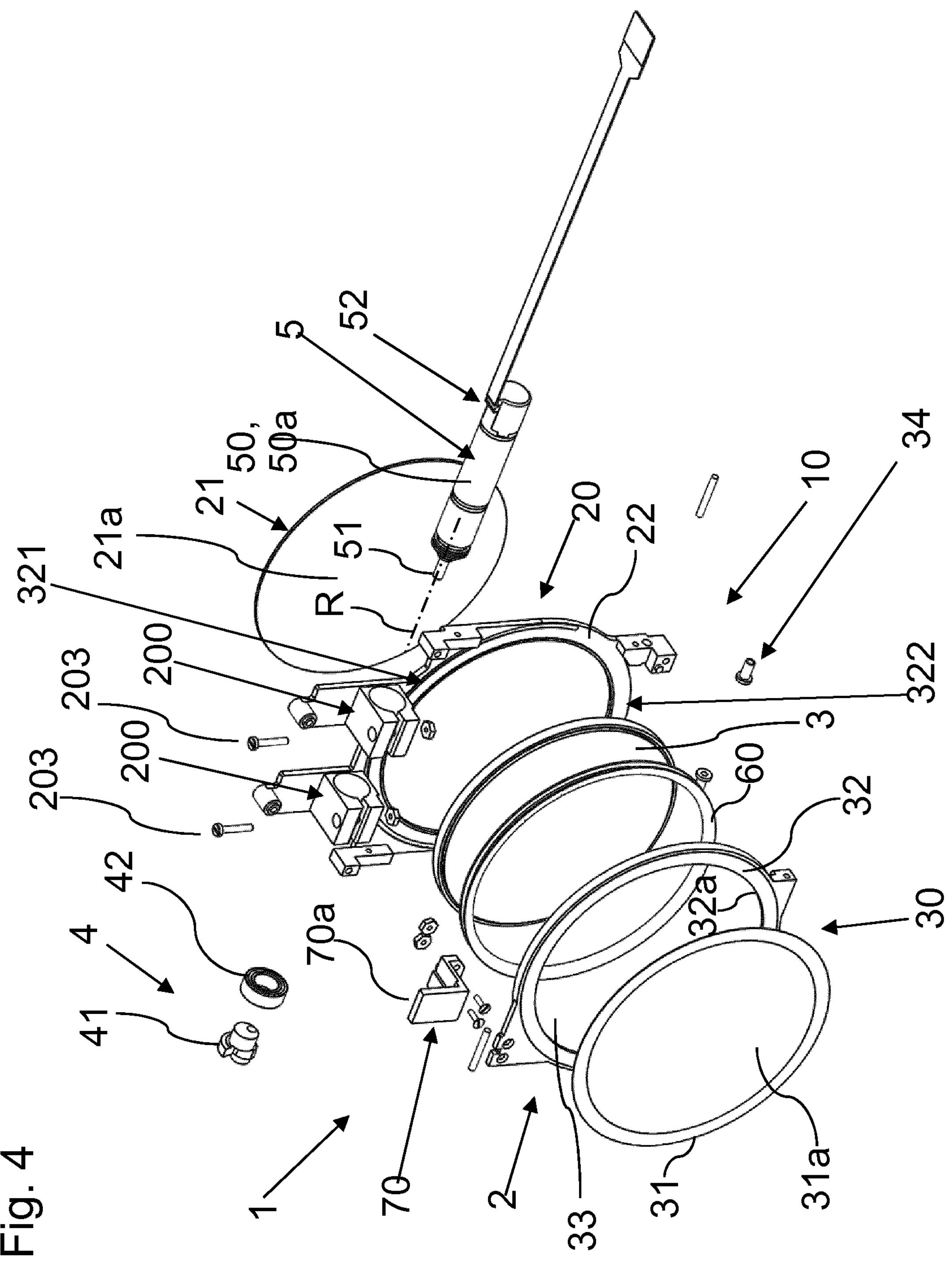
FIG. 4 shows an exploded view of the optical device shown in FIGS. 1 to 3.
Figure 5:
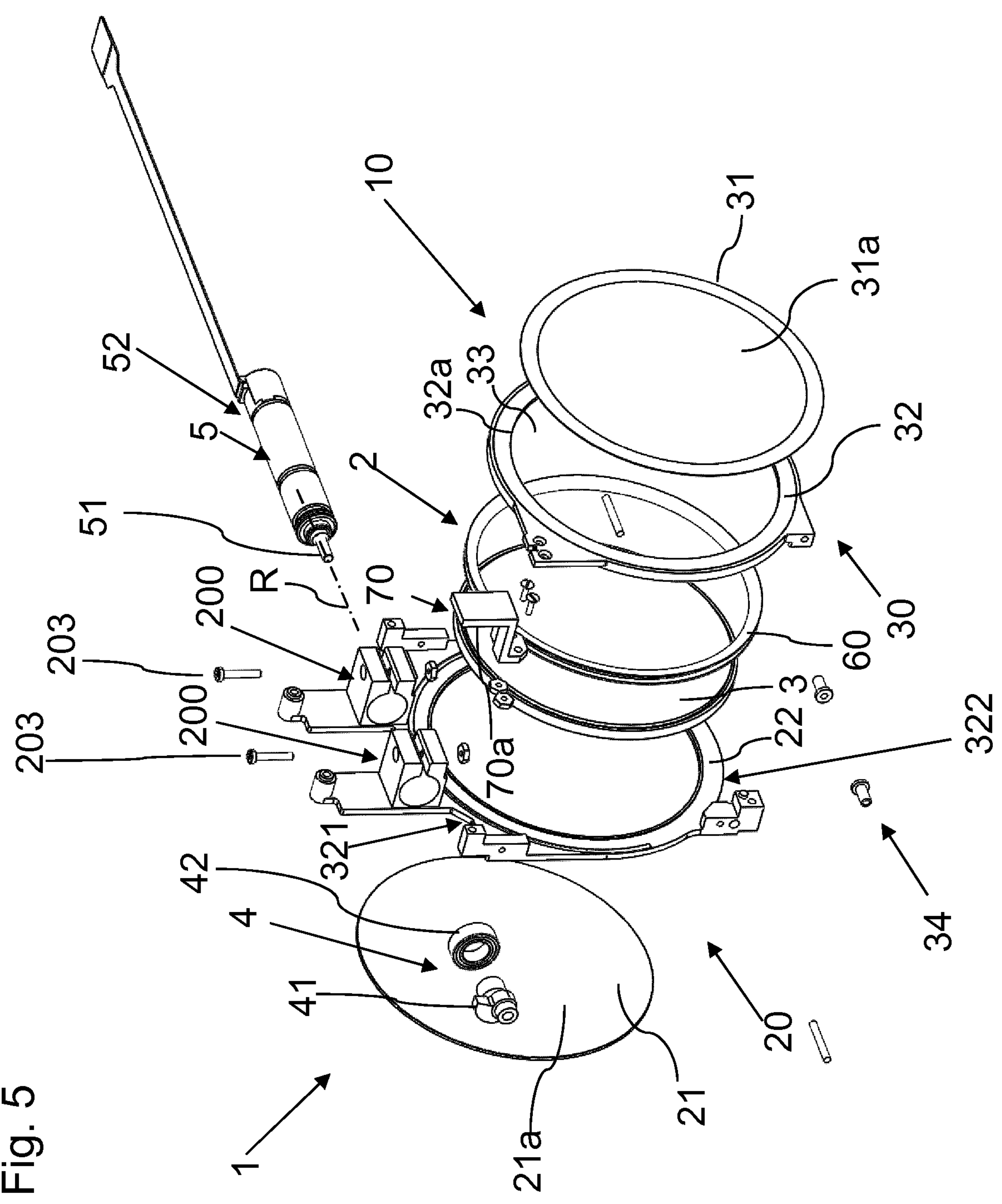
FIG. 5 shows a further exploded view of the optical device shown in FIGS. 1 to 4.
Figures 6, 7, 8:
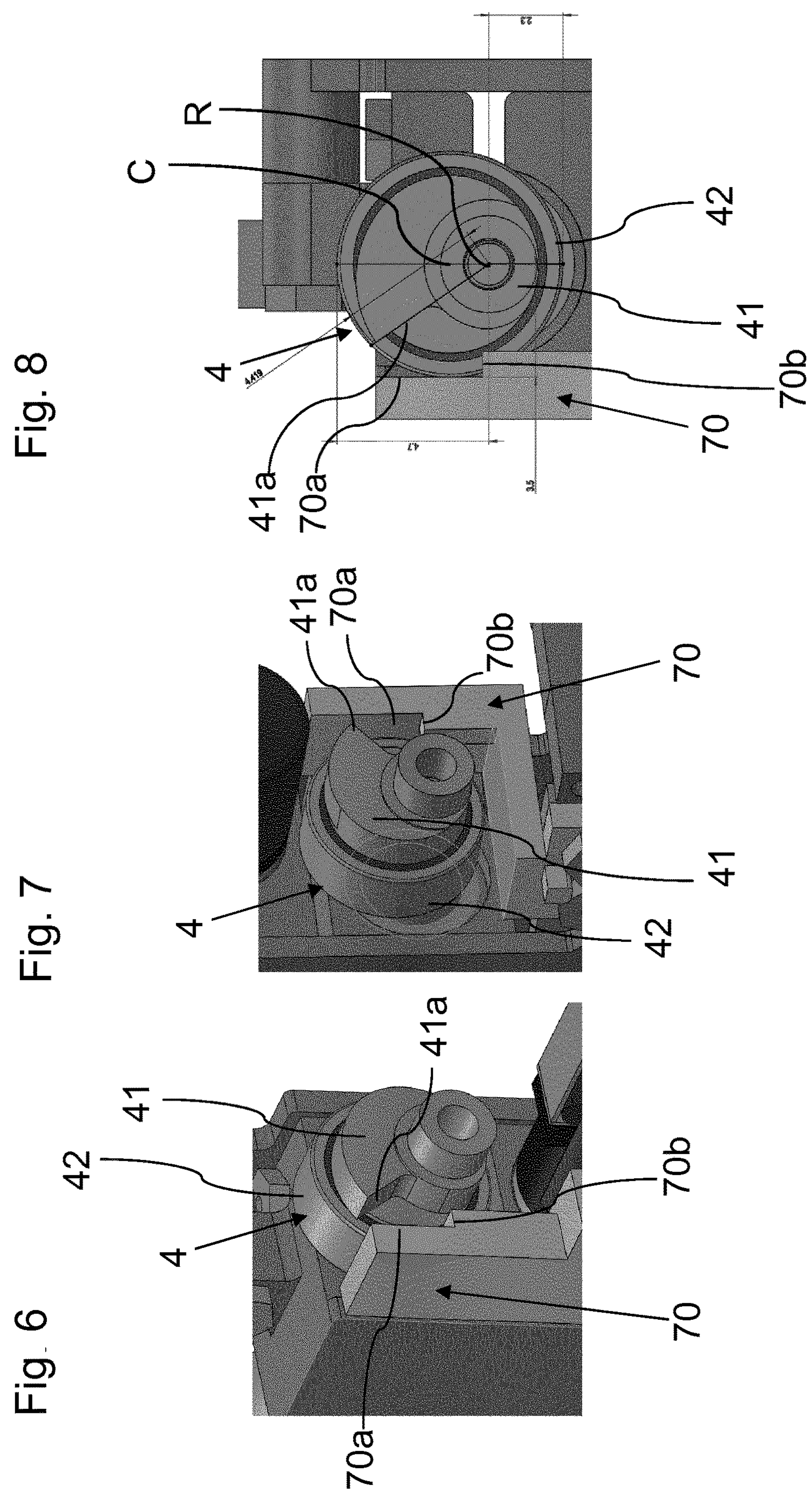
FIG. 6 shows a cam of an embodiment of an optical device according to the present invention.
FIG. 7 shows a cam of an embodiment of an optical device according to the present invention.
FIG. 8 shows a different perspective of the cam shown in FIG. 6.

Furthermore, as shown in FIGS. 4 and 5 as well as FIGS. 6 to 8, the cam 4 comprises an excentric member 41 arranged on the drive shaft 51 so that a center C of the excentric member 41 is spaced apart from the rotation axis R or from a center of the drive shaft. To reduce friction with the contact surface 70*a* of the arm 70, the cam 4 further comprises one or more of an annular bearing 42, a brake 42B, and a clutch 42C, for example arranged on the excentric member 41. For example, the bearing 42 is configured to contact the contact surface 70*a* in order to pivot the second wall 30.

Furthermore, as shown in FIGS. 6 to 8 the excentric member 41 can comprise a stop 41*a* that is configured to contact a step 70*b* of the contact surface 70*a* of the arm 70 to limit rotation of the cam 4 about the rotation axis R. Due to the fact that the cam 4 contacts the contact surface 70*a*, the contact surface 70*a* is also denoted as cam follower 70*a*.

Particularly, FIGS. 6 and 8 show different perspectives of the same embodiment, which particularly can be used as a cam follower configuration for a convex embodiment (i.e. the membrane 31 comprises a convex bulge). The configuration shown in FIG. 7 can be used for a concave embodiment, i.e., where the membrane 31 comprises a concave shape/curvature.

Figure 9:
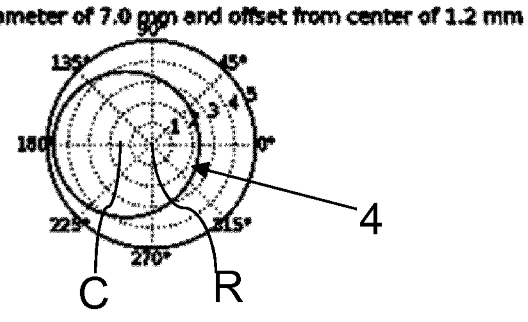
FIG. 9 shows the diameter of a cam that can be used with an optical device according to the present invention.

Further, FIG. 9 shows exemplary dimensions of a cam 4 that can be used in the framework of the present invention. According thereto, the bearing 42 of the cam 4 may comprise an outer diameter of 7 mm wherein the center C of the cam 4 can be offset from the rotation axis R by 1.2 mm.

Figure 10:
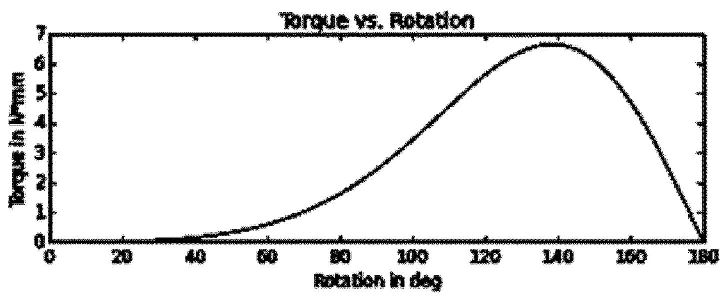
FIG. 10 shows the torque as a function of a rotation angle of the cam shown in FIG. 9.
Figure 11:
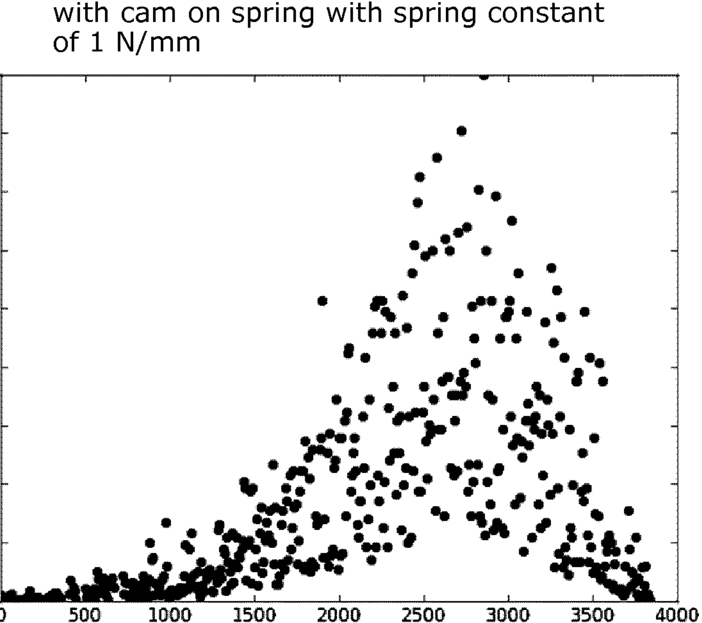
FIG. 11 shows a holding power vs. a position of the motor with the cam pressing on a spring having a spring constant of 1 N/mm.
Figure 12:
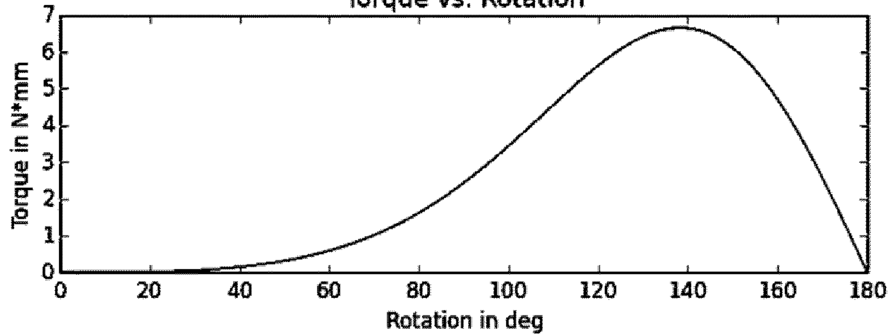
FIG. 12 shows the calculated torque vs rotation with a spring constant of 1 N/mm.

In this regard, FIG. 10 shows the torque as a function of the rotation of the cam 4 about the rotation axis R. FIG. 12 shows the calculated torque vs rotation with a spring constant of 1 N/mm.

Figure 14:
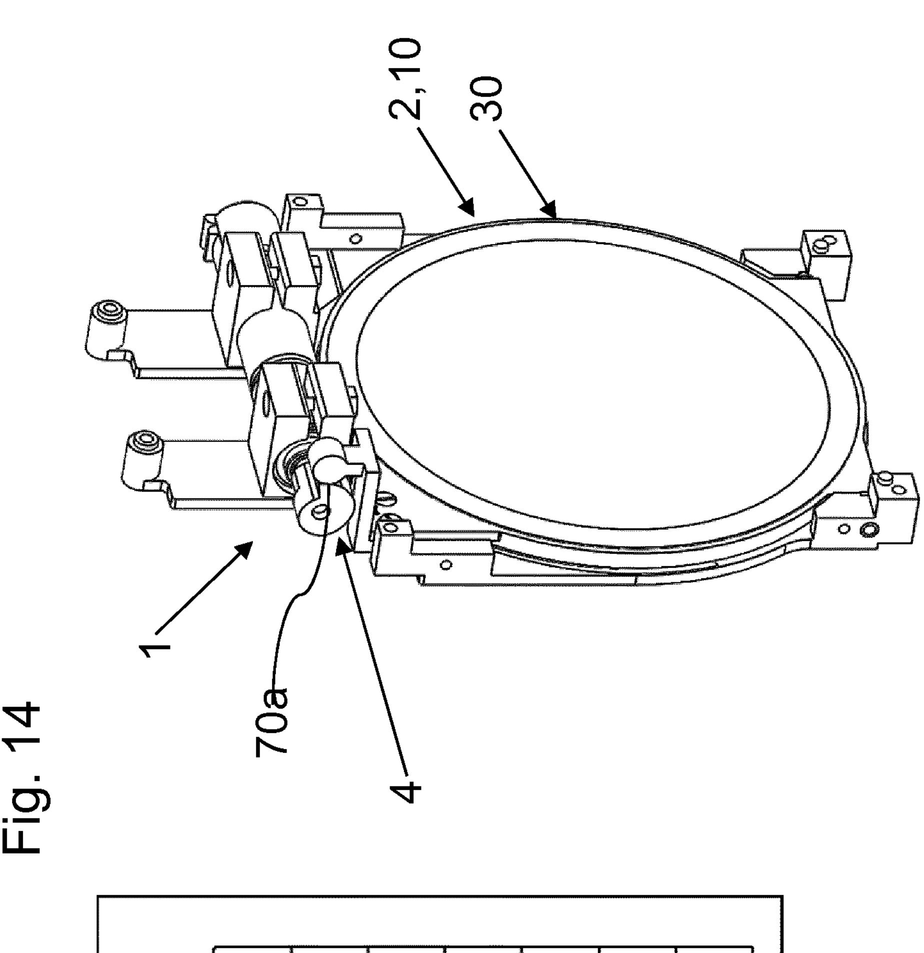
FIG. 14 shows an embodiment of the optical device comprising a cam and circular cam follower (contact surface), wherein the cam has three regions of constant radius concentric to the motor axis (i.e. regions of zero torque) as shown in FIG. 15.
Figure 13:
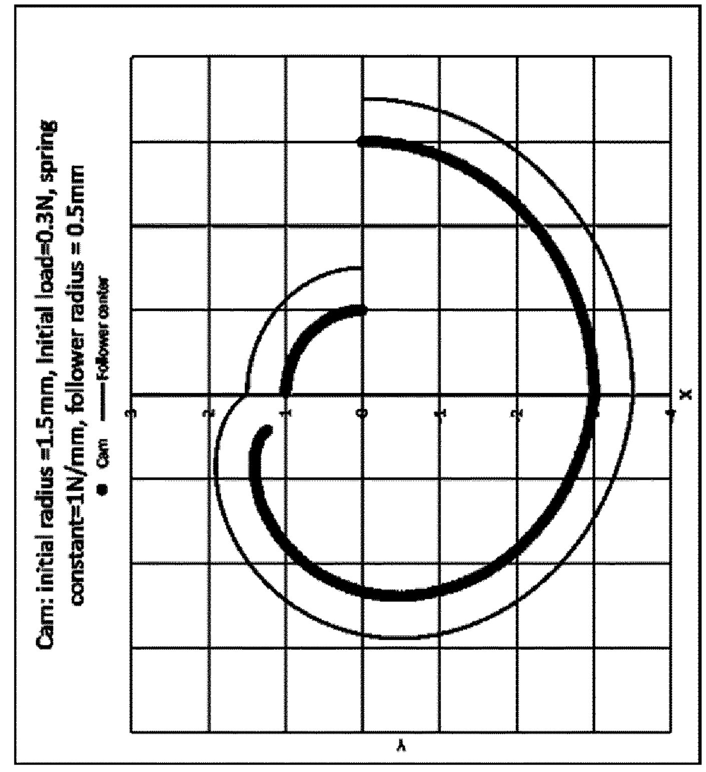
FIG. 13 shows an optimised cam profile and the position of the center axis of the cam follower for the specified constraints. The cam's profile is not continuous—any form can be taken to make it continuous as long as the distance remains not closer to the defined follower center than 0.5 mm (the follower radius)

FIG. 13 shows an optimised cam profile and the position of the center axis of the cam follower for the specified constraints. The cam is profile is not continuous—any form can be taken to make it continuous as long as the distance remains not closer to the defined follower center than 0.5 mm (the follower radius). Particularly, such a cam profile of a cam 4 is preferably used with a circular contact surface 70*a* (cam follower) as shown in FIG. 14.

Figure 15:
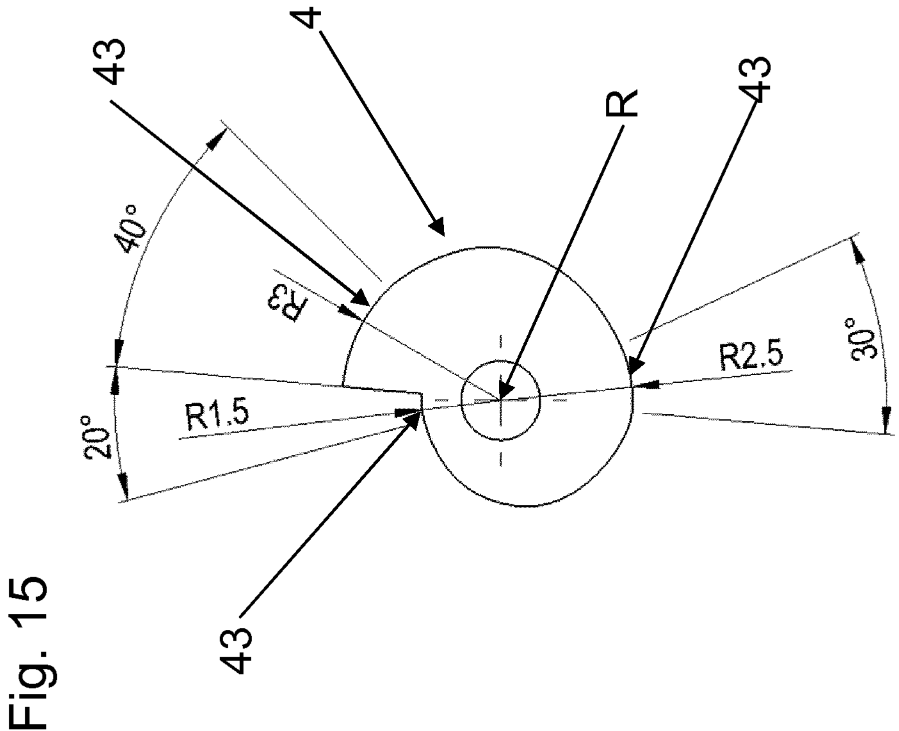
FIG. 15 shows a cam profile comprising regions of constant radius concentric to the motor axis (i.e. regions of zero torque)

Further, FIG. 15 shows an example of a cam 4 comprising regions 43 (for contacting the contact surface 70*a*) of constant radius concentric to the motor/rotation axis R (i.e. regions 43 of zero torque).

Figure 16:
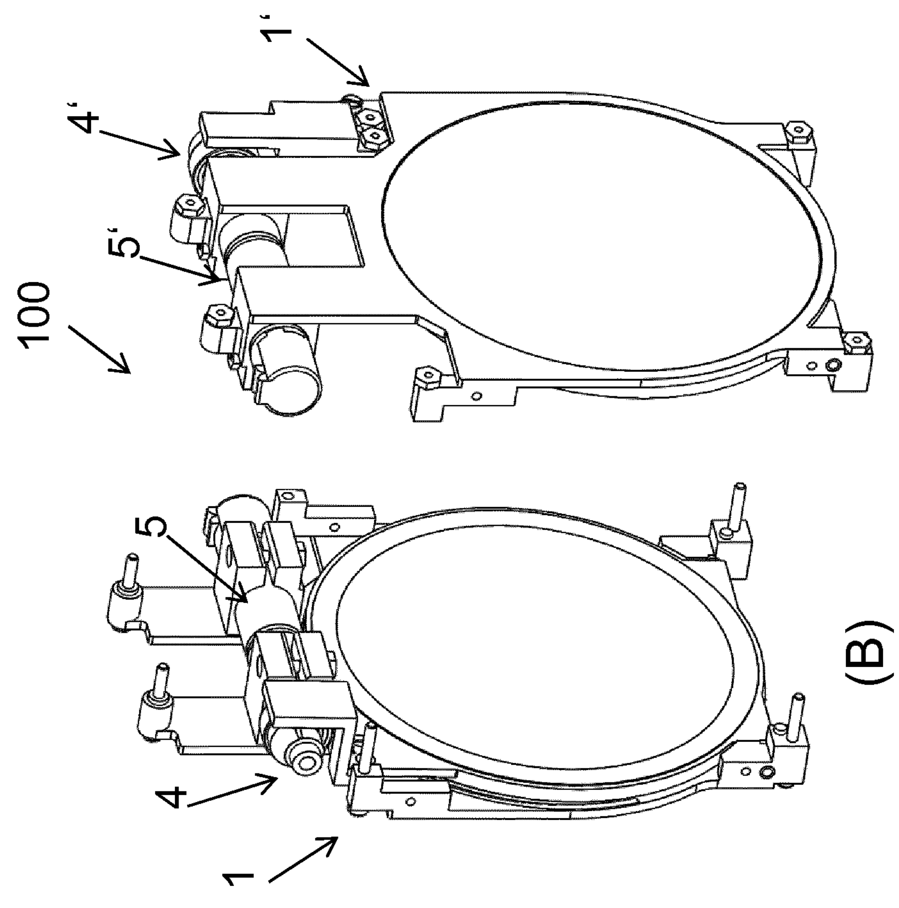
FIG. 16 shows an embodiment of an optical device comprising two adjustable lenses.
Figure 16:
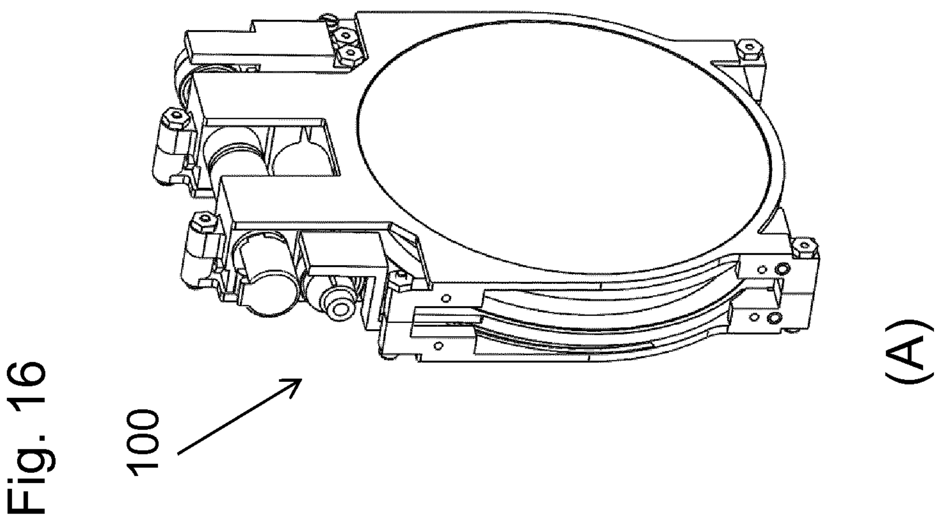

Furthermore, as shown in FIG. 16, the present invention of course also allows to combine optical devices 1, 1' according to the present invention that can be tuned with cams 4, 4' and motors 5, 5' (e.g. as described herein) to an optical system 100 as shown in FIG. 16 (A) to (C), wherein here one optical device 1 comprises a lens having a negative focal power (i.e. a convex membrane), while the other device 1' comprises a lens having positive focal power (i.e. a concave membrane). Particularly, FIG. 16 (A) shows a perspective view of the combined device 100, FIG. 16 (B) shows an exploded view, and FIG. 16 (C) shows a cross-sectional view.

Figure 17:
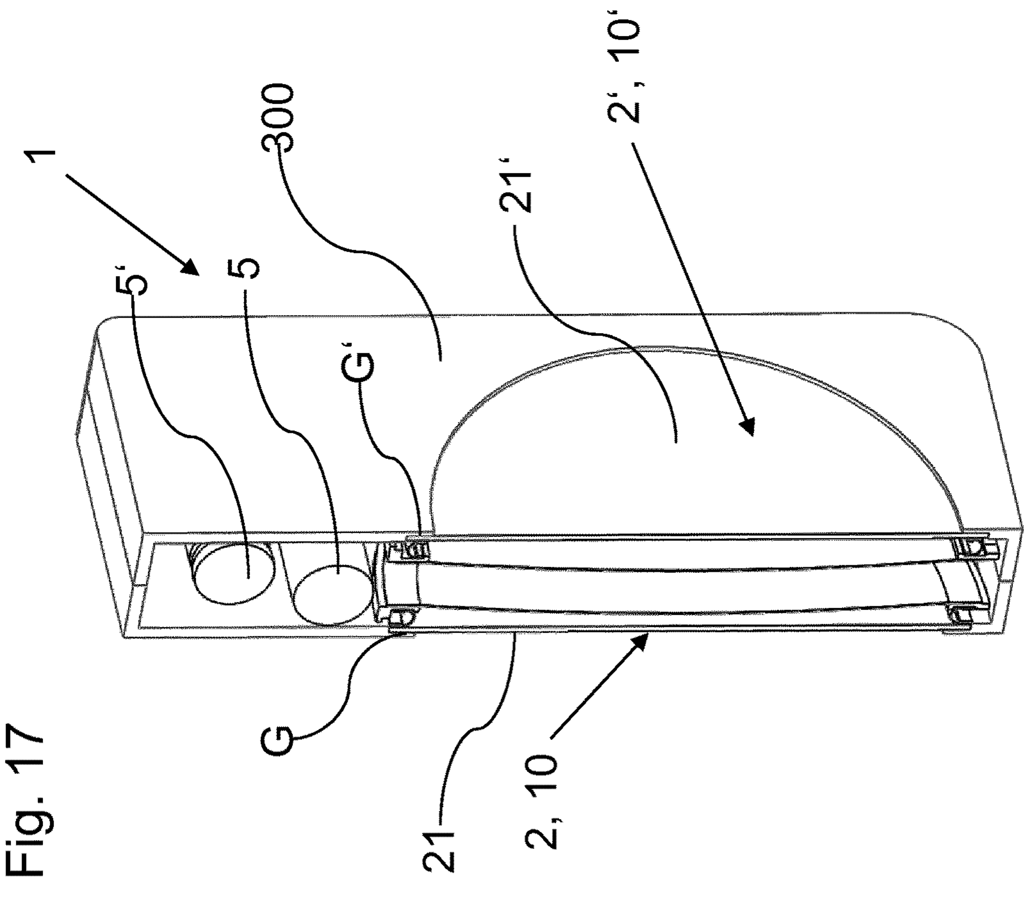
FIG. 17 shows an embodiment of the present invention, wherein the optical device comprises a casing that encloses the components of the optical device.
Figure 16:
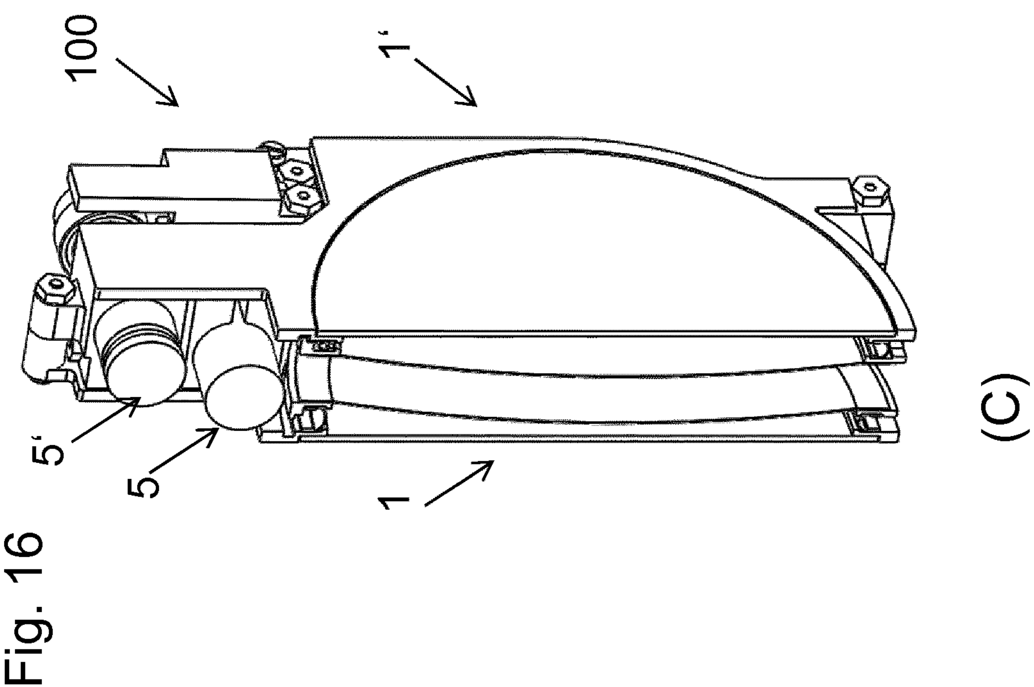

Furthermore, as shown in the cross-sectional view of FIG. 17, the optical device 1 can comprise a casing 300 according to an embodiment of the present invention, which casing 300 may be configured to provide an outer surface/shell of the optical device (e.g. for protection of the device). Particularly, the casing 300 can enclose components such as cam(s) and motor(s) 5, 5' of the device 1 as well as other components. Particularly, at least one non-actuated optical element, such as the cover elements 21, 21', forms a portion of the casing 300 as well as particularly an outermost optical element 21, 21' of the optical device 1. Here, in FIG. 17, the optical device 1 comprises—besides container 2 of lens 10—a further container 2' of a lens 10' having a focal length that is adjustable as described herein (e.g. with a cam and a motor).

Particularly, the optical device 1 comprising the casing 300 forms an eyewear for a person. Furthermore, the casing 300 can form a bezel configured to hide glue joints G, G' between the non-actuated (e.g. outermost) optical elements 21, 21' and the casing 300.

The invention claimed is:

1. An optical device comprising:

an optical element, a motor, and a cam, wherein the motor is configured to rotate the cam so that the cam interacts with the optical element to adjust a parameter of the optical element, the motor (5) comprises an encoder (52) configured to provide an output signal indicative of a position of the cam (4), and the optical element comprises a container, wherein the container comprises a first wall and an opposing second wall, and wherein the optical device comprises a sensor arranged on an arm (70) of the optical element (10) to measure a position of the second wall (30) of the optical element (10), wherein the first wall comprises a circumferential support frame and an elastically deformable membrane that is connected to the support frame of the first wall, and wherein the second wall comprises a circumferential support frame, and wherein the support frame of the second wall is pivotably mounted to the support frame of the first wall, and the cam is configured to contact a contact surface (70*a*) of the support frame of the second wall (30) so that when the cam is rotated by the motor (5) it pivots the support frame of the second wall (30) towards and away from the support frame of the first wall (20) about an axis distal to an optical axis (A) of the optical device.

2. The optical device according to claim 1, wherein the optical element is a lens, and wherein the parameter is a focal length of the lens.

3. The optical device according to claim 1, wherein each wall comprises a transparent portion, and wherein the container is filled with a transparent liquid arranged between the transparent portions of the walls.

4. The optical device according to claim 3, wherein the first wall comprises a rigid transparent cover element that is connected to the support frame of the first wall, wherein the cover element forms the transparent portion of the first wall; and wherein the second wall comprises an elastically deformable membrane that is connected to the support frame of the second wall, wherein the membrane forms the transparent portion of the second wall.

5. The optical device according to claim 3, wherein the membrane forms the transparent portion of the first wall; and wherein the second wall comprises a rigid transparent cover element that is connected to the support frame of the second wall, wherein the cover element forms the transparent portion of the second wall.

6. The optical device according to claim 4, wherein the cam is configured to interact with the container to adjust a curvature of the membrane and thereby the parameter of the optical element.

7. The optical device according to claim 5, wherein the motor is mounted to the support frame of the first wall via at least one motor mount connected to the support frame of the first wall, wherein the at least one motor mount encompasses a housing of the motor along a periphery of the housing.

8. The optical device according to claim 3, wherein the first and the second wall are connected to one another by a flexible lateral wall of the container, wherein the lateral wall (60) forms a bellows.

9. The optical device according to claim 3, wherein the cam is configured to press against a contact surface connected to the second wall so that when the cam is rotated by the motor the second wall is pivoted away or towards the first wall to adjust the curvature of the membrane and therewith the parameter of the optical element.

10. Optical device according to claim 1, wherein the optical device comprises a pump reservoir, wherein the cam is configured to actuate the pump reservoir to pass liquid from the pump reservoir into the container so as to adjust the parameter of the optical element.

11. Optical device according to claim 1, wherein the optical parameter of the optical element is adjustable within a tuning range of the parameter, wherein the cam is configured such that when the cam is rotated by the motor, a torque acting on the cam is constant within the tuning range.

12. Optical device according to claim 1, characterized in that each wall comprises a transparent portion, and wherein the container is filled with a transparent liquid arranged between the transparent portions of the walls, and wherein the arm is connected to the support frame of the second wall.

13. Optical device according to claim 1, wherein the motor comprises a drive shaft that is rotatable by the motor about a rotation axis, and wherein the cam comprises an excentric member arranged on the drive shaft, and wherein the cam further comprises a bearing arranged on the excentric member, which bearing is configured to contact the contact surface.

14. Optical device according to claim 1, wherein the optical device is configured to adjust the parameter of the optical element to assume one of a plurality of discrete parameter values, wherein the cam comprises for each of the discrete parameter values a region, wherein the respective region of the cam is configured to contact the contact surface so that the associated discrete parameter value is assumed by the optical element, wherein the respective region is adapted such that a torque acting on the cam when the respective region contacts the contact surface vanishes or corresponds to a local minimum of the torque.

15. Optical device according to claim 1, wherein the optical device comprises a clutch configured to decouple the cam from the motor and/or wherein the optical device comprises a brake configured to act on the rotation axis or on the drive shaft.

16. Optical device according to claim 1, wherein the optical device comprises a further optical element and a further cam, wherein the motor is configured to rotate the further cam so that the further cam interacts with the further optical element to adjust a parameter of the further optical element, the further optical element is a further lens, and wherein the parameter of the further optical element is a focal length of the further lens, and wherein the cam and the further cam are configured such that the parameters of the lens and of the further lens are one of: individually adjusted, adjusted such that they are identical to one another, adjusted such that they are reciprocal to one another.

17. Optical device according to claim 9, wherein the contact surface is formed by an arm, wherein the arm or a part of the optical device, which part is particularly connected to the arm, comprises at least a portion formed out of a material that has a thermal expansion characteristic that causes the second wall to move relative to the first wall for a given position of the cam through an operation temperature of the optical device, wherein the material of said portion and its geometry is selected such that said movement of the second wall compensates a thermal expansion of the liquid in the container so as to reduce a drift of the focal length of the lens.

18. Optical device according to claim 1, wherein the optical device comprises a worm drive which couples the motor to the cam.

19. An optical device comprising:

an optical element, a motor, and a cam, wherein the motor is configured to rotate the cam so that the cam interacts with the optical element to adjust a parameter of the optical element, the motor (5) comprises an encoder (52) configured to provide an output signal indicative of a position of the cam (4), and the optical element comprises a container, wherein the container comprises a first wall and an opposing second wall, and wherein the optical device comprises a sensor arranged on an arm (70) of the optical element (10) to measure a position of the second wall (30) of the optical element (10), wherein the first wall comprises a circumferential support frame and an elastically deformable membrane that is connected to the support frame of the first wall, and wherein the second wall comprises a circumferential support frame, and wherein the support frame of the second wall is pivotably mounted to the support frame of the first wall via two axially aligned bearings, and the cam is configured to contact a contact surface (70*a*) of the support frame of the second wall (30) so that when the cam is rotated by the motor (5) it pivots the second wall (30) towards and away from the first wall (20).

* * * * *